United States Patent [19]

Maki

[11] Patent Number: 5,600,451
[45] Date of Patent: Feb. 4, 1997

[54] CHARGE TRANSFER DEVICE AND OUTPUT CIRCUIT THEREOF

[75] Inventor: Yasuhito Maki, Kanagawa, Japan

[73] Assignee: Sony Corporation, Tokyo, Japan

[21] Appl. No.: 288,038

[22] Filed: Aug. 10, 1994

[30] Foreign Application Priority Data

Aug. 12, 1993 [JP] Japan ................................. 5-200675

[51] Int. Cl.$^6$ ................................................ H04N 1/04
[52] U.S. Cl. .......................... 358/483; 348/300; 348/241;
365/182; 250/214 A; 250/214 C; 358/471
[58] Field of Search .................................. 358/483, 482,
358/471, 400, 401; 348/241, 244, 245,
222, 313, 250, 300; 327/491; 307/520,
497; 365/182, 208, 210; 364/862; 250/214 A,
214 C

[56] References Cited

U.S. PATENT DOCUMENTS

| | | | |
|---|---|---|---|
| 4,518,926 | 5/1985 | Swanson | 330/253 |
| 4,556,910 | 12/1985 | Tisue | 348/241 |
| 4,644,287 | 2/1987 | Levine | 348/241 |
| 4,689,808 | 8/1987 | Mooxman et al. | 348/241 |
| 4,764,814 | 8/1988 | Endo et al. | 348/241 |
| 4,984,204 | 1/1991 | Sato et al. | 365/189.11 |
| 5,182,658 | 1/1993 | Ishizaki et al. | 358/483 |
| 5,384,570 | 1/1995 | Dedic | 341/172 |

FOREIGN PATENT DOCUMENTS 4358481  12/1992  Japan .

*Primary Examiner*—Edward L. Coles, Sr.
*Assistant Examiner*—Fan Lee
*Attorney, Agent, or Firm*—Ronald P. Kananen

[57] ABSTRACT

A charge transfer device is disclosed. The charge transfer device has: a charge transfer section for outputting a signal charge; a voltage signal output circuit for converting the signal charge into a voltage and outputting a voltage signal; a reference signal output circuit for outputting a reference signal of a predetermined voltage, the reference signal output circuit having a circuit constant substantially equal to a circuit constant of the voltage signal output circuit; and a differential operational amplifying circuit for amplifying a difference between the voltage signal from the voltage signal output circuit and the reference signal from the reference signal output circuit and outputting the amplified difference.

12 Claims, 6 Drawing Sheets

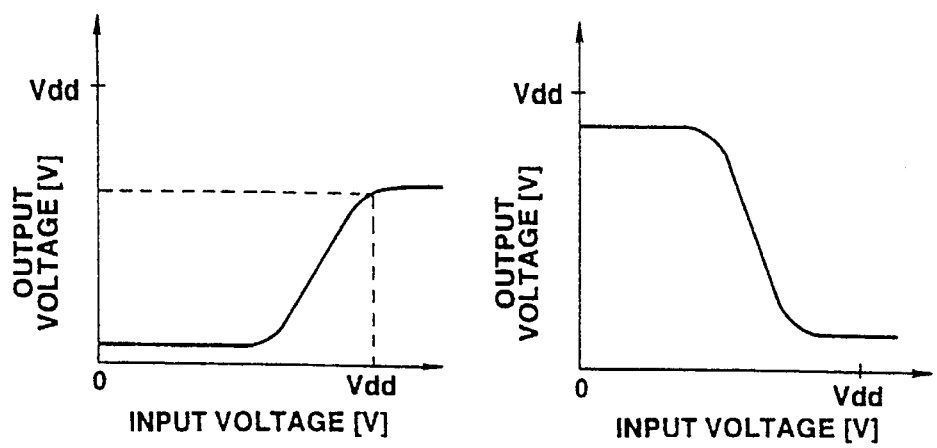
FIG.3A
(PRIOR ART)
FIG.3B
(PRIOR ART)
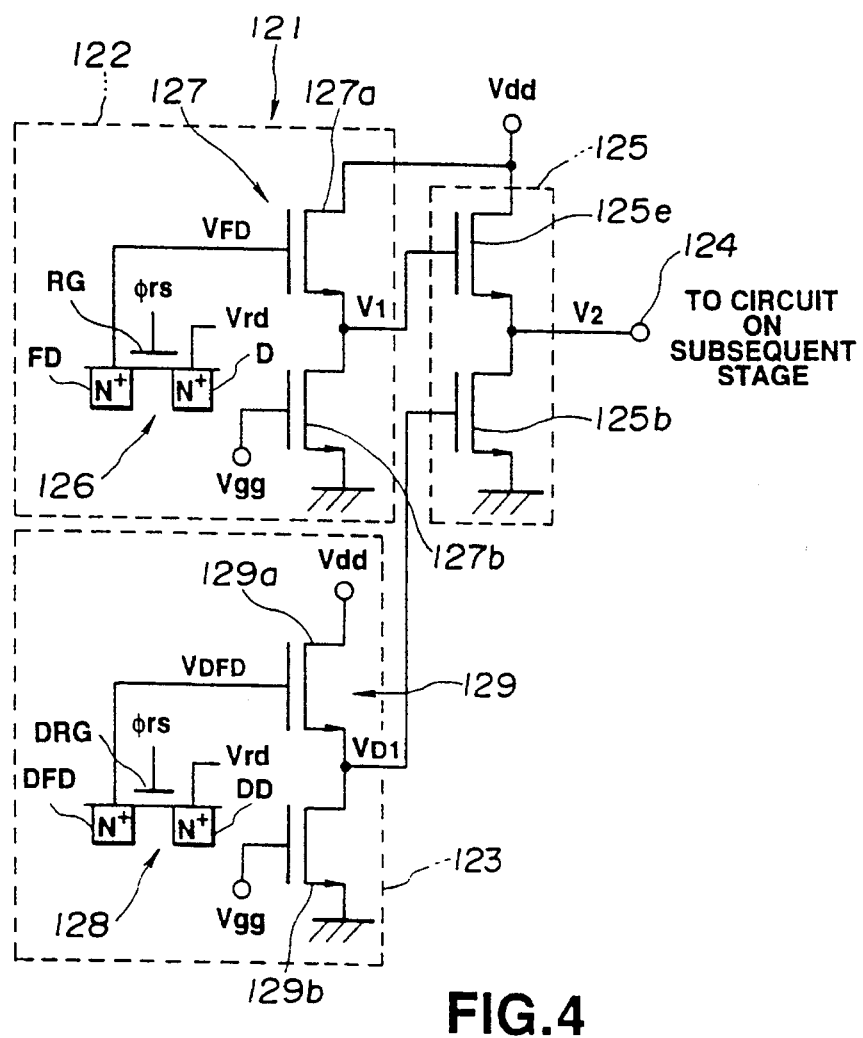
FIG.4

CHARGE TRANSFER DEVICE AND OUTPUT CIRCUIT THEREOF

BACKGROUND OF THE INVENTION

1. Field of the Invention

This invention relates to a charge transfer device having a so-called floating diffusion or floating gate for converting signal charges from a charge transfer unit composed of a CCD into an output voltage, and to an output circuit thereof.

2. Description of the Related Art

Recently, an image scanner device for electrically reading out draft images and characters as image information and a CCD delay line for delaying supplied signals in a predetermined manner have been known as the device having a charge transfer unit composed of a CCD.

The image scanner reads out draft images and characters with a CCD line sensor having linearly arrayed plural pixels 100, as shown in FIG. 1. The image scanner device drives its light source to emit light for a predetermined period during a readout term for draft images and characters, and controls the CCD line sensor in motion to scan the draft while driving the light source to emit light.

Thus, a reflected light from the draft is radiated onto the CCD line sensor. The CCD line sensor then receives the reflected light from the draft with each of the pixels 100 and stores the charge corresponding to the light amount of the received reflected light in the pixels 100. The charge stored in each of the pixels 100 is read out at predetermined time intervals, and is transferred through a shift gate 101 to a shift register 102. The charge transferred to the shift register 102 is transferred to an output circuit 103, which then converts the charge into a voltage signal and supplies the resulting voltage signal through an output terminal 104 to an image processing circuit, not shown.

The image processing circuit performs a so-called process treatment such as black level correction or white level correction on the supplied voltage signal or image signal, and adds a horizontal synchronizing signal or a vertical synchronizing signal to the voltage signal. The image processing circuit then supplies the resulting voltage signal to a monitor device or the like. Thus, the draft images and characters are displayed on the display screen of the monitor device.

The conventional output circuitry for converting the signal charge transferred by the shift register 102 into the voltage signal is composed mainly of a source follower circuit and an analog inverter. In further detail, as seen in FIG. 2, the conventional output circuitry is constituted by a charge-voltage converter 111 having a floating diffusion (FD) for performing charge-voltage conversion, a reset gate electrode (RG) and a drain region (D) which are formed adjacently to the floating diffusion (FD), and by buffer circuitry 112 connected to a subsequent stage of the charge-voltage converter 111, as shown in FIG. 2.

The buffer circuitry 112 has the following structure as shown in FIG. 2. The buffer circuitry 112 has its first and second stages connected with first and second source follower circuits 113, 114, respectively, each having a drive transistor Q1 of N-channel MOS and a load transistor Q2 of N-channel MOS which are connected in series. Also, the buffer circuitry 112 has its third and fourth stages connected with first and second analog inverters 115, 116, respectively, each having a load transistor Q3 of P-channel MOS and a drive transistor Q4 of N-channel MOS which are connected in series. Further, the buffer circuitry 112 has its final stage connected with a third source follower circuit 117 having a drive transistor Q1 and a load transistor Q2 of N-channel MOS which are connected in series.

An output voltage signal Vout is outputted through an output terminal 118 from a common contact of the drive transistor Q1 and the load transistor Q2 in the source follower circuit 117 on the final stage. A constant voltage $V_{gg}$ is applied through an input terminal 119 to the gate electrodes of the load transistors Q2 in the first, second and third source follower circuits 113, 114 and 117.

However, the output circuitry of the above structure and particularly the buffer circuitry have the following problems. As seen from input/output characteristics of the source follower circuit and the analog inverter shown in FIGS. 3A and 3B, the DC level differs between input and output. Consequently, DC matching must be taken on each stage. As the analog inverters 115, 116 of high gain and a high gain amplifier externally connected thereto particularly have narrow optimum dynamic ranges for input, changes in temperature and power source voltage may cause the DC level to be off the dynamic range.

Also, in this output circuitry, the signal charge which has been voltage-converted by the floating diffusion (FD) is swept away toward the drain region (D) by applying a reset pulse φrs to the reset gate electrode (RG). On the application of the reset pulse φrs in this case, the voltage level of the floating diffusion (FD) is equal to a drain voltage level $V_{rd}$. When the reset pulse φrs is at a lower level, an incidental capacity between the floating diffusion (FD) and the reset gate electrode (RG) causes the voltage level of the floating diffusion (FD) to be lowered to the level of the reset pulse φrs. This phenomenon is a so-called coupling of the incidental capacity, which generates unnecessary signal components to be superposed on the output voltage signal. Consequently, in order to maintain the voltage signal within the input dynamic ranges of the analog inverter and the high gain amplifier, it has been the only effective measure to limit the change width of the signal components, that is, to reduce the maximum charge amount handled by the shift register 102 while allowing deterioration in light receiving sensitivity.

In view of the above, the present Applicant has proposed, in the JP Patent Laid-Open (KOKAI) Publication No. 4-358481, a method of reducing effects of the coupling due to the reset pulse φrs by providing a coupling restriction circuit in the output circuitry, in order to maintain the charge-voltage converted voltage signal within the input dynamic ranges of the analog inverter and the high gain amplifier, that is, to effectively utilize the dynamic point of the input/output characteristics.

The structure of the output circuitry having the coupling restriction circuit as proposed above will now be described with reference to FIGS. 4 and 5A to 5D.

The output circuitry 121 is constituted by a voltage signal output section 122 connected to the shift register 102 as shown in FIG. 1 and adapted for outputting a voltage signal $V_1$ corresponding to the signal charge transferred from the shift register, a dummy pulse output section 123 for outputting only a dummy pulse $V_{D1}$ as follows, and a differential amplifying circuit 125 for extracting only the signal components by detecting a difference between the voltage signal $V_1$ from the voltage signal output section 122 and the dummy pulse $V_{D1}$ from the dummy pulse output section 123 and then amplifying the resulting signal components with a predetermined gain so as to output an output signal $V_2$ from an output terminal 124, as shown in FIG. 4.

The output circuitry 121 is also connected externally with a high gain amplifier, not shown, for amplifying with a high gain the voltage signal $V_2$ from the differential amplifying circuit 125 and then supplying the amplified voltage signal to an image processing circuit on the subsequent stage.

The voltage signal output section 122 is constituted by a discharge element 126 composed of a floating diffusion (FD), a reset gate electrode (RG) and a drain region (D), and a first source follower circuit 127 provided on the subsequent stage of the discharge element 126 and composed of an output element 127a and a load resistance element 127b connected in series. The discharge element 126 and the first source follower circuit 127 are so connected that a voltage change caused by the stored charge to the floating diffusion (FD) is applied to a gate electrode of the output element 127a and that a constant voltage $V_{gg}$ is applied to a gate electrode of the load resistance element 127b.

The dummy pulse output section 123 is constituted by a discharge element 128 composed of a floating diffusion (DFD), a reset gate electrode (DRG) and a drain region (DD), and a second source follower circuit 129 provided on the subsequent stage of the discharge element 128 and composed of an output element 129a and a load resistance element 129b connected in series. The discharge element 128 and the second source follower circuit 129 are so connected that a voltage change of the floating diffusion (DFD) due to application of a reset pulse $\phi$rs to the reset gate electrode (DRG) is applied to a gate electrode of the output element 129a and that a constant voltage $V_{gg}$ is applied to a gate electrode of the load resistance element 129b.

The differential amplifying circuit 125 is constituted by first and second output elements 125a and 125b connected in series, so that a common contact potential $V_1$ of the output element 127a and the load resistance element 127b of the first source follower circuit 127 in the voltage signal output section 122 is applied to a gate electrode of the first output element 125a and that a common contact potential $V_{D1}$ of the output element 129a and the load resistance element 129b of the second source follower circuit 129 in the dummy pulse output section 123 is applied to a gate electrode of the second output element 125b.

A power source voltage Vdd is applied to a drain terminal of the output element 127a in the first source follower circuit 127, a drain terminal of the output element 129a in the second source follower circuit 129 and a drain terminal of the first output element 125a in the differential amplifying circuit 125.

In the output circuitry 121 of the above-described structure, the reset pulse $\phi$rs is supplied to the reset gate electrode (RG) of the discharge element 126 of the voltage signal output section 122 prior to the transfer of the signal charge to the floating diffusion (FD). If the reset pulse $\phi$rs is supplied, the signal charge stored in the floating diffusion (FD) is swept away through the drain region (D), and the floating diffusion (FD) is reset to the initial voltage Vrd.

When the floating diffusion (FD) is reset, the signal charge transferred from a transfer electrode on the final stage of the shift register 102 is transferred to and stored in the floating diffusion (FD), thus causing a voltage change corresponding to the signal charge stored in the floating diffusion (FD). This voltage change is supplied as a voltage signal $V_{FD}$ to the gate electrode of the output element 127a in the first source follower circuit 127.

The first source follower circuit 127, in which the constant voltage $V_{gg}$ is applied to the gate electrode of the load resistance element 127b, supplies the voltage signal $V_{FD}$ from the floating diffusion (FD) to the gate electrode of the first output element 125a of the differential amplifying circuit 125, with a gain ≈+0.8 where the code + indicates non-inversion.

Specifically, the voltage signal $V_{FD}$ supplied to the first source follower circuit 127 is composed of signal components of three terms, that is, a reset term tr during which the reset pulse $\phi$rs is supplied, a feed through term tf which elapses since the reset pulse $\phi$rs is supplied until the signal charge is supplied from the shift register 102, and a signal term ts until the stored signal charge is voltage-converted and supplied to the output element 127a of the first source follower circuit 127, as shown in FIG. 5A.

The initial voltage Vrd emerges in the floating diffusion (FD) during the reset term tr, and the low level potential of the reset pulse $\phi$rs due to the coupling effects of the incidental capacity between the floating diffusion (FD) and the reset gate electrode (RG) emerges in the floating diffusion (FD) during the feed through term tf, while a signal component corresponding to the stored charge emerges during the signal term ts.

The voltage signal $V_{FD}$ has a waveform in which a level waveform of the initial voltage Vrd, a low level waveform of the reset pulse $\phi$rs and the signal component are superposed, as shown in FIG. 5A. Therefore, if the voltage signal $V_{FD}$ is directly outputted, the difference between the initial voltage Vrd and the low level of the reset pulse $\phi$rs as an unnecessary signal component, that is, the amount of coupling, increases the amplitude of the voltage signal $V_2$ to exceed the input dynamic range of the high gain amplifier connected to the subsequent stage, causing the voltage signal $V_2$ to be cut off. Thus, the voltage signal $V_2$ cannot be amplified satisfactorily.

However, in the proposed output circuitry 121, if the reset pulse $\phi$rs is supplied to the reset gate electrode (RG) of the voltage signal output section 122, the reset pulse $\phi$rs synchronous with the above reset pulse is supplied to the reset gate electrode (DRG) of the discharge element 128 in the dummy pulse output section 123. Thus, a dummy pulse $V_{DFD}$ of low level having an upper limit level of the initial voltage Vrd and a lower limit level of the reset pulse $\phi$rs is outputted, synchronously with the reset term tr, to the gate electrode of the output element 129a in the second source follower circuit 129, as shown in FIG. 5B. This dummy pulse $V_{DFD}$ is current-amplified with a gain ≈+0.3 by the second source follower circuit 129, and is supplied as a dummy pulse $V_{D1}$ to the gate electrode of the output element 125b in the differential amplifying circuit 125 on the subsequent stage.

In this case, an output impedance of the differential amplifying circuit 125 is varied by the dummy pulse $V_{D1}$, consequently causing a dummy pulse component corresponding to the coupling amount to be subtracted from the voltage signal $V_1$ as shown in FIG. 5C. It is thus possible to produce a true signal component as shown in FIG. 5D. The differential amplifying circuit 125 further amplifies this signal component with a predetermined gain and supplies the amplified signal component as a voltage signal $V_2$ through the output terminal 124 to the high gain amplifier on the next stage.

The high gain amplifier is thus capable of amplifying only the true signal component composed of the voltage signal $V_1$ from which the coupling amount removed, with a high gain, and producing a voltage signal of satisfactory S/N ratio. Consequently, if the charge transfer device is used on a charge transfer stage of a CCD image sensor, the true signal component having no excessive signal component corresponding to the coupling amount can be amplified by the high gain amplifier and be supplied to an image processing circuit or the like on the subsequent stage, so as to project a highly defined image on the screen of the monitor device.

However, the proposed CCD line sensor has a problem yet to be solved though it is advantageous in removing the coupling amount from the voltage signal $V_1$ transferred from the voltage signal output section 122.

Changes in temperature and power source voltage of an electronic equipment, such as an image scanner device, incorporating the above charge transfer device therein causes level fluctuation in the voltage signal $V_2$ outputted from the output terminal 124 of the differential amplifying circuit 125. If the level fluctuation is generated in the voltage signal $V_2$, the voltage signal $V_2$ falls off the input dynamic range of the high gain amplifier on the subsequent stage. Consequently, the high gain amplifier cannot perform sufficient amplification, and the image scanner device cannot produce a highly-defined image.

OBJECT AND SUMMARY OF THE INVENTION

In view of the above-described status of the art, it is an object of the present invention to provide a charge transfer device which is capable of correcting level fluctuation in the voltage signal due to changes in temperature and power source voltage of the electronic equipment incorporating the charge transfer device therein, supplying a voltage signal corresponding to the input dynamic range of the high gain amplifier connected to the subsequent stage, and producing a highly defined image when used on a charge transfer stage of the image scanner device.

According to the present invention, there is provided a charge transfer device having: a charge transfer section for outputting a signal charge; a voltage signal output circuit for converting the signal charge into a voltage and outputting a voltage signal; a reference signal output circuit for outputting a reference signal of a predetermined voltage, the reference signal output circuit having a circuit constant substantially equal to a circuit constant of the voltage signal output circuit; and a differential operational amplifying circuit for amplifying a difference between the voltage signal from the voltage signal output circuit and the reference signal from the reference signal output circuit and outputting the amplified difference.

The voltage signal output circuit has a first output circuit for converting the signal charge from the charge transfer section and outputting a first voltage signal, a second output circuit for outputting a bias component of the first voltage signal, and a differential amplifying circuit for amplifying a difference between the first voltage signal and the bias component and outputting the amplified difference.

The first output circuit, the second output circuit and the differential amplifying circuit may be constituted by source follower circuits, respectively.

Preferably, the reference signal output circuit is constituted by a source follower circuit having a number of stages equal to the number of stages of the previous source follower circuits.

The differential amplifying circuit may be constituted by a current mirror circuit composed of plural N-channel MOS transistors, and a source follower circuit.

Preferably, an amplification factor variable control circuit for variably controlling an amplification factor of the differential operational amplifying circuit is provided between the reference signal output circuit and the differential operational amplifying circuit.

According to the present invention, there is also provided an output circuit of a charge transfer device having: a voltage signal output section for converting a signal charge from a charge transfer section into a voltage and outputting a voltage signal; a reference signal output section for outputting a reference signal of a predetermined voltage, the reference signal output section having a circuit constant substantially equal to a circuit constant of the voltage signal output section; and a differential operational amplifying section for amplifying a difference between the voltage signal from the voltage signal output section and the reference signal from the reference signal output section and outputting the amplified difference.

The voltage signal output section has a first output circuit section for converting the signal charge from the charge transfer section and outputting a first voltage signal, a second output circuit section for outputting a bias component of the first voltage signal, and a differential amplifying section for amplifying a difference between the first voltage signal and the bias component and outputting the amplified difference.

The first output circuit section, the second output circuit section and the differential amplifying section may be constituted by source follower circuits, respectively.

Preferably, the reference signal output section is constituted by a source follower circuit having a number of stages equal to the number of stages of the previous source follower circuits.

In the charge transfer device according to the present invention, the voltage signal from the voltage signal output circuit for outputting the voltage signal from the charge transfer section is supplied to the differential operational amplifying circuit on the subsequent stage, and the reference signal from the reference signal output circuit for outputting the reference signal of the predetermined voltage is also supplied to the differential operational amplifying circuit on the subsequent stage.

At this point, the voltage signal output circuit and the reference signal output circuit have substantially the same circuit constant. Therefore, level fluctuation in the voltage signal from the voltage signal output circuit causes level fluctuation of the same phase and the same amount in the reference signal from the reference signal output circuit. It is thus possible to subtract a signal component corresponding to the level fluctuation from the voltage signal in the differential operational amplifying circuit on the subsequent stage, so as to correct the level fluctuation in the voltage signal.

Particularly when the voltage signal output circuit is constituted by the first output circuit for outputting the voltage signal from the charge transfer section, the second output circuit for outputting at least the bias component of the voltage signal and the differential amplifying circuit for amplifying the difference between the voltage signal from the first output circuit and the bias component from the second output circuit and outputting the amplified difference, the voltage signal from the first output circuit for outputting the voltage signal from the charge transfer section is first supplied to the differential amplifying circuit on the subsequent stage, and the bias component from the second output circuit for outputting at least the bias component of the voltage signal is also supplied to the differential amplifying circuit on the subsequent stage.

The differential amplifying circuit removes the bias component from the supplied voltage signal and amplifies the resulting voltage signal. Therefore, the signal outputted from the differential amplifying circuit consists of a true signal component of the voltage signal from the first output circuit from which the bias component is removed and which is amplified. To the differential operational amplifying circuit, the true signal component amplified by the differential amplifying circuit and the reference signal from the reference signal output circuit are supplied. The signal outputted from the differential operational amplifying circuit is the true signal component of the voltage signal, which is corrected in level fluctuation due to changes in temperature and power source voltage. Thus, a signal of a level adjusted to an input dynamic range of a high gain amplifier connected to the subsequent stage of the differential operational amplifying circuit can be produced.

The first output circuit, the second output circuit and the differential amplifying circuit constituting the voltage signal output circuit are constituted by the source follower circuits, and the reference signal output circuit is constituted by the source follower circuit of the same number of stages as that of the source follower circuit constituting the voltage signal output circuit. Thus, the reference signal output circuit can be formed to have a circuit constant equal to that of the voltage signal output circuit, and can be formed on a single substrate along with the voltage signal output circuit. Consequently, fluctuation in threshold value in producing the source follower circuits can be absorbed by the differential operational amplifying circuit on the subsequent stage.

Also, as the differential operational amplifying circuit is constituted by the current mirror circuit composed of plural N-channel MOS transistors and the source follower circuit, the reference operational amplifying circuit can be formed on a single substrate along with the voltage signal output circuit and the reference signal output circuit. In addition, the charge transfer section and its peripheral circuits, that is, the voltage signal output circuit, the reference signal output circuit and the differential operational amplifying circuit, can be formed in one chip. Thus, the electronic equipment incorporating the present charge transfer device therein can be reduced in size.

The differential operational amplifying circuit amplifies the difference between the voltage signal and the reference signal. Therefore, by providing the amplification factor variable control circuit for variably controlling the amplification factor of the differential operational amplifying circuit between the reference signal output circuit and the reference operational amplifying circuit, the amplification factor for the voltage signal from the voltage signal output circuit is variably controlled. That is, the level of the voltage signal can be variably controlled so as to be adjusted to the input dynamic ranges of various high gain amplifiers selectively connected to the subsequent stage, and changing the charge transfer device itself in design in accordance with input/output characteristics of the high gain amplifier connected to the subsequent stage can be omitted.

BRIEF DESCRIPTION OF THE DRAWINGS

FIGS. 3A and 3B are graphs showing input/output characteristics of various circuits in the conventional output circuitry. FIG. 3A shows input/output characteristics of a source follower circuit. FIG. 3B shows input/output characteristics of an analog inverter.

FIG. 4 is circuit diagram showing an output circuitry of a proposed example.

DESCRIPTION OF THE PREFERRED EMBODIMENTS

Two embodiments of the charge transfer device according to the present invention, hereinafter referred to as the charge transfer device of the first embodiment and the charge transfer device of the second embodiment, will now be described with reference to FIGS. 6 to 9 and FIGS. 5A to 5D.

The charge transfer devices of the first and second embodiments can be used on a charge transfer stage of an image scanner for electrically reading out draft images and characters as image information or a charge transfer stage of a CCD delay line for delaying a supplied signal in a predetermined manner.

Figure 6:
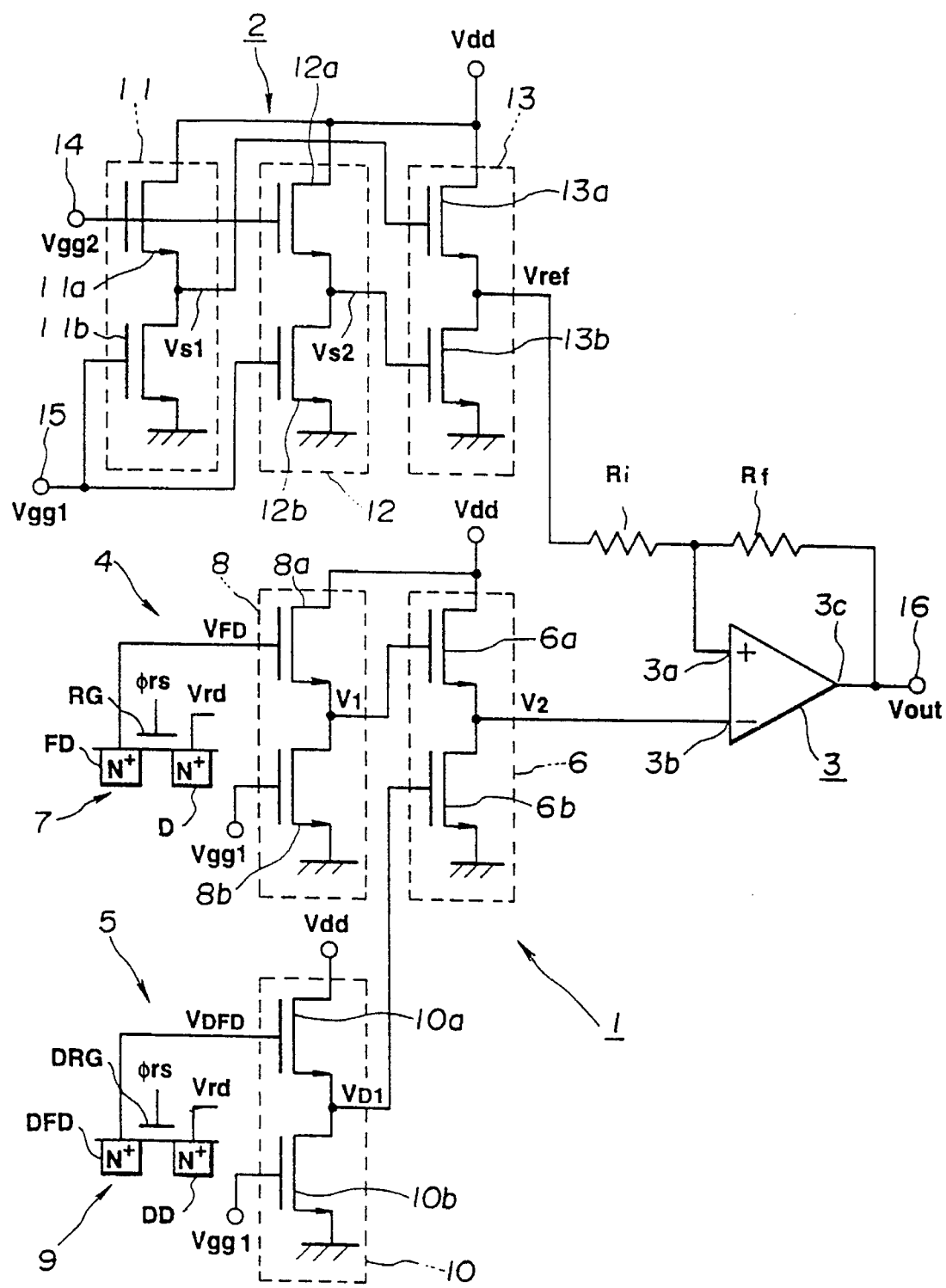
FIG. 6 is a circuit diagram showing essential portions of a first embodiment of a charge transfer device according to the present invention, hereinafter referred to as the charge transfer device of the first embodiment, and particularly an output circuitry thereof.

The charge transfer device of the first embodiment has the following structure as shown in FIG. 6. The charge transfer device has a correction voltage output circuit 1 for voltage-converting a signal charge from a charge transfer section constituted by a CCD, not shown, then correcting the voltage signal and outputting the corrected signal as a correction voltage signal $V_2$. The charge transfer device also has a reference signal output circuit 2 for outputting a predetermined reference voltage $V_{ref}$, and a differential operational amplifying circuit 3 for voltage-amplifying a difference between the reference signal $V_{ref}$ from the reference signal output circuit 2 and the correction voltage signal $V_2$ of the correction voltage output circuit 1 with a predetermined gain.

The correction voltage output circuit 1 is constituted by a charge-voltage converting section 4 formed adjacently to the final stage of a charge transfer section, not shown, and adapted for outputting a voltage signal $V_1$ corresponding to a signal charge transferred from the charge transfer section, a dummy pulse output section 5 for outputting only a dummy pulse $V_{D1}$ as described later, and a first differential amplifying circuit 6 for detecting a difference between the voltage signal $V_1$ from the charge-voltage converting section 4 and the dummy pulse $V_{D1}$ from the dummy pulse output section 5 so as to extract only a signal component and amplifying the extracted signal component with a predetermined gain so as to output the amplified signal component.

The charge-voltage converting section 4 is constituted by a discharge element 7 composed of a floating diffusion (FD), a reset gate electrode (RG) and a drain region (D), and a first source follower circuit 8 provided on the subsequent stage of the discharge element 7 and composed of an output element 8a and a load resistance element 8b connected in series. The output element 8a and the load resistance element 8b are so connected that a voltage change followed by a stored charge in the floating diffusion (FD) is applied to a gate electrode of the output element 8a and that a constant voltage $V_{gg1}$ is applied to a gate electrode of the load resistance element 8b.

The dummy pulse output section 5 is constituted by a discharge element 9 composed of a floating diffusion (DFD), a reset gate electrode (DRG) and a drain region (DD), and a second source follower circuit 10 provided on the subsequent stage of the discharge element 9 and composed of an output element 10a and a load resistance element 10b connected in series. The output element 10a and the load resistance element 10b are so connected that a voltage change of the floating diffusion (DFD) due to the application of a reset pulse φrs to the reset gate electrode (DRG) is applied to a gate electrode of the output element 10a and that a constant voltage $V_{gg1}$ is applied to a gate electrode of the load resistance element 10b.

The first differential amplifying circuit 6 is constituted by a first output element 6a and a second output circuit 6b connected in series, so that a common contact potential $V_1$ of the output element 8a and the load resistance element 8b of the first source follower circuit 8 in the charge-voltage converting section 4 is applied to a gate electrode of the first output element 6a and that a common contact potential $V_{D1}$ of the output element 10a and the load resistance element 10b of the second source follower circuit 10 in the dummy pulse output section 5 is applied to a gate electrode of the second output element 6b.

The output element 8a and the load resistance element 8b in the charge-voltage converting section 4, the output element 10a and the load resistance element 10b in the dummy pulse output section 5, and the first and second output elements 6a and 6b in the first differential amplifying circuit 6 are composed of N-channel MOS transistors, respectively.

Power source voltages $V_{dd}$ are applied to a drain terminal of the output element 8a in the first source follower circuit 8, a drain terminal of the output element 10a in the second source follower circuit 10 and a drain terminal of the first output element 6a in the first differential amplifying circuit 6, respectively.

Meanwhile, the reference signal output circuit 2 is constituted by a first source follower circuit 11 composed of an output element 11a and a load resistance element 11b connected in series, a second source follower circuit 12 composed of an output element 12a and a load resistance element 12b connected in series, and a second differential amplifying circuit 13 composed of a first output element 13a and a second output element 13b connected in series.

These circuits 11 to 13 are so connected that a voltage $V_{gg2}$ of an average value of voltages read out from floating diffusions (FD) is applied to gate electrodes of the output element 11a in the first source follower circuit 11 and the output element 12a in the second source follower circuit 12, and that a constant voltage $V_{gg1}$ is applied to gate electrodes of the load resistance element 11b in the first source follower circuit 11 and the load resistance element 12b in the second source follower circuit 12.

Also, the above circuits 11 to 13 are so connected that an output potential $V_{S1}$, that is, a contact potential of the output element 11a and the load resistance element 11b, of the first source follower circuit 11 is applied to a gate electrode of the first output element 13a in the second differential amplifying circuit 13, and that an output potential $V_{S2}$, that is, a contact potential of the output element 12a and the load resistance element 12b, of the second source follower circuit 12 is applied to a gate electrode of the second output element 13b in the second differential amplifying circuit 13.

The output element 11a and the load resistance element 11b of the first source follower circuit 11, the output element 12a and the load resistance element 12b of the second follower circuit 12, and the first and second output elements 13a and 13b of the second differential amplifying circuit 13 in the reference signal output circuit 2 are composed of N-channel MOS transistors, respectively.

Power source voltages $V_{dd}$ are applied to a drain terminal of the output element 11a in the first source follower circuit 11, a drain terminal of the output element 12a in the second source follower circuit 12 and a drain terminal of the first output element 13a in the second differential amplifying circuit 13, respectively.

Meanwhile, the differential operational amplifying circuit 3 has its inversion input terminal 3a connected via a resistor Ri to the connecting point of the first output element 13a and the second output element 13b constituting the second differential amplifying circuit 13 in the reference signal output circuit 2, and also connected via a negative feedback resistor Rf to an output terminal 3c of the differential operational amplifying circuit 3. The differential operational amplifying circuit 3 has its non-inversion input terminal 3b connected to the connecting point of the first output element 6a and the second output element 6b constituting the first differential amplifying circuit 6 of the correction voltage output circuit 1.

In the present first embodiment, the correction voltage output circuit 1 and the reference signal output circuit 2 have substantially the same circuit constant. Stated differently, the first source follower circuit 8, the second source follower circuit 10 and the first differential amplifying circuit 6 constituting the correction voltage output circuit 1 correspond to the first source follower circuit 11, the second source follower circuit 12 and the second differential amplifying circuit 13 constituting the reference signal output circuit 2, respectively, with the circuit constant of these corresponding circuits set to be substantially equal.

To the charge transfer device of the first embodiment, a high gain amplifier, not shown, is externally connected for amplifying a voltage signal Vout outputted from the differential operational amplifying circuit 3 with a high gain and supplying the amplified voltage signal to a signal processing circuit on the subsequent stage.

The operation of the charge transfer device of the first embodiment having the above-described structure will now be described.

Prior to transfer of the signal charge to the floating diffusion (FD) in the discharge element 7, a reset pulse φrs is supplied to the reset gate electrode (RG) of the discharge element 7. As the reset pulse φrs is supplied, the signal charge stored in the floating diffusion (FD) is swept away through the drain region (D), and the floating diffusion (FD) is reset to the initial voltage Vrd.

As the floating diffusion (FD) is reset, the signal charge transferred from a transfer electrode on the final stage of the charge transfer section, not shown, is transferred to and stored in the floating diffusion (FD). Thus, a change in voltage corresponding to the charge amount of the signal charge stored in the floating diffusion (FD) is generated. This change in voltage is supplied as a voltage signal $V_{FD}$ to the gate electrode of the output element 8a in the first source follower circuit 8.

The first source follower circuit 8, in which the constant voltage $V_{gg1}$ is applied to the gate electrode of the load resistance element 8b, supplies the voltage signal $V_{FD}$ from the floating diffusion (FD) to the gate electrode of the first output element 6a of the first differential amplifying circuit 6 with a gain ≈+0.8 wherein the code+indicates non-inversion.

Figure 1:
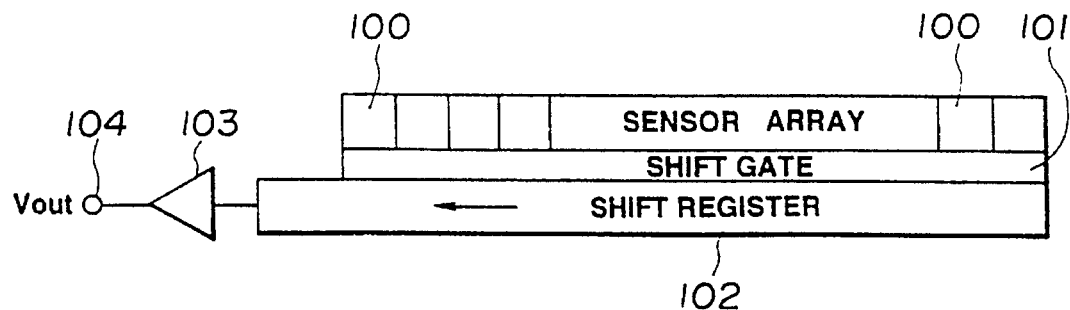
FIG. 1 is a view showing the structure of a general CCD line sensor provided in a conventional image scanner device.
Figure 2:
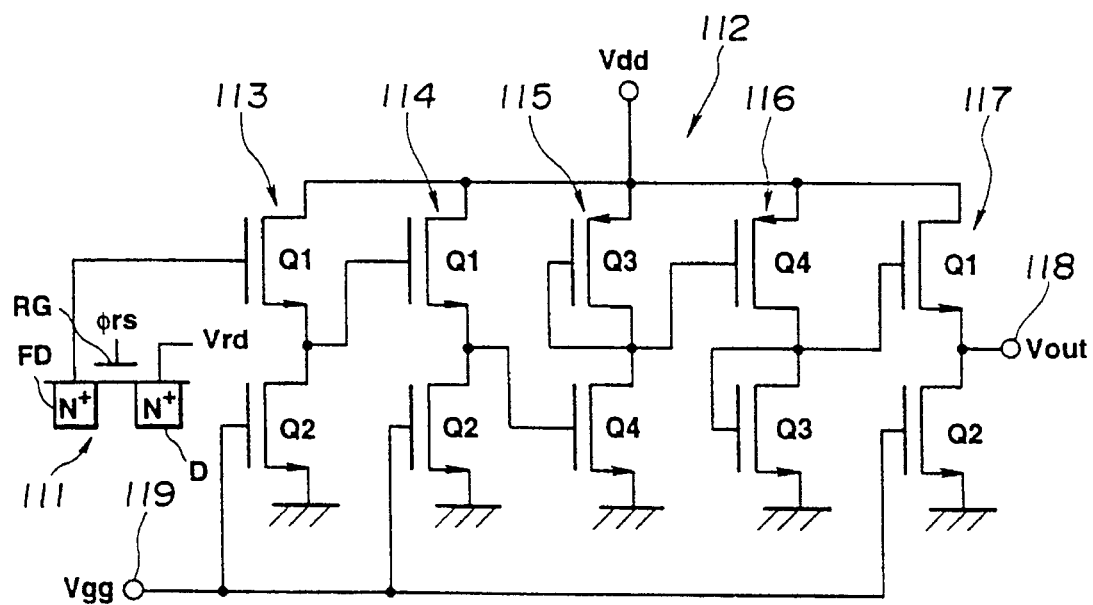
FIG. 2 is a circuit diagram showing a conventional output circuitry provided in a CCD line sensor.
Figure 5A:
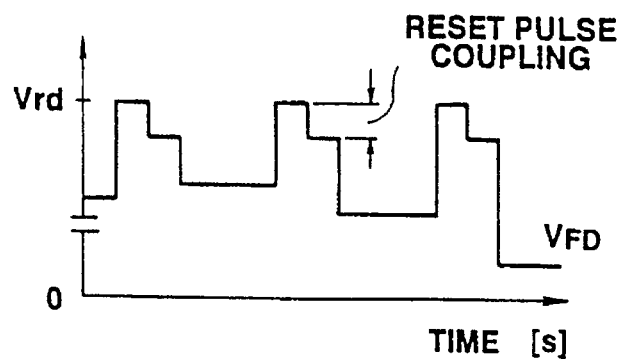
FIGS. 5A to 5D are timing charts showing signal processing of the output circuitry of the proposed example.

In further detail, the voltage signal $V_{FD}$ supplied to the first source follower circuit 8 is composed of signal components of three terms, that is, a reset term tr during which the reset pulse φrs is supplied, a feed through term tf which elapses since the reset pulse φrs is supplied until the signal charge from the charge transfer section, not shown, is supplied, and a signal term ts until the stored signal charge is voltage-converted and supplied to the output element 8a of the first follower circuit 8, as shown in FIG. 5A.

The initial voltage Vrd of the floating diffusion (FD) emerges during the reset term tr, and a low-level potential of the reset pulse φrs due to coupling effects of the incidental capacity between the floating diffusion (FD) and the reset gate electrode (RG) emerges during the feed through term tf. A voltage signal corresponding to the stored signal charge emerges during the signal term ts.

The voltage signal $V_{FD}$ has a waveform in which a level waveform of the initial voltage Vrd, a low-level waveform of the reset pulse φrs and a signal component are superposed, as shown in FIG. 5A. Therefore, if the voltage signal $V_{FD}$ is directly outputted, the difference between the initial voltage Vrd and the low level of the reset pulse φrs as the unnecessary signal component, that is, the coupling amount, increases the amplitude of the voltage signal $V_{FD}$ to exceed the input dynamic range of the high gain amplifier connected to the subsequent stage, causing the voltage signal $V_{FD}$ to be cut off. Thus, the voltage signal $V_{FD}$ cannot be amplified satisfactorily.

Figure 5B:
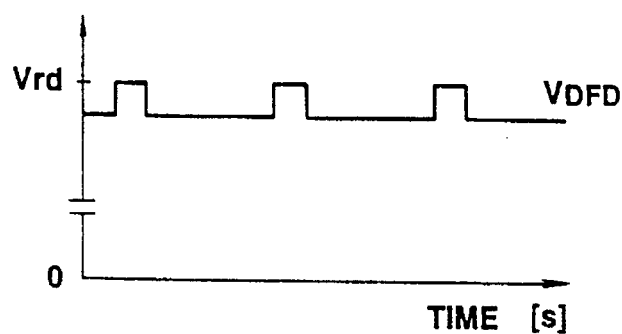

However, in the correction voltage output circuit 1 according to the first embodiment, as the reset pulse φrs is supplied to the reset gate electrode (RG) of the charge-voltage converting section 4, the reset pulse φrs is synchronously supplied to the reset gate electrode (DRG) of the discharge element 9 in the dummy pulse output section 5. Thus, a dummy pulse $V_{DFD}$ synchronous with the reset term tr having an upper level equal to the initial voltage Vrd and a lower level equal to the low level of the reset pulse φrs is outputted to the gate electrode of the output element 10a in the second source follower circuit 10, as shown in FIG. 5B. This dummy pulse $V_{DFD}$ is current-amplified by the second source follower circuit 10 with a gain≈+0.3, and is supplied as the dummy pulse $V_{D1}$ to the gate electrode of the second output element 6b in first differential amplifying circuit 6 on the subsequent stage.

Figure 5C:
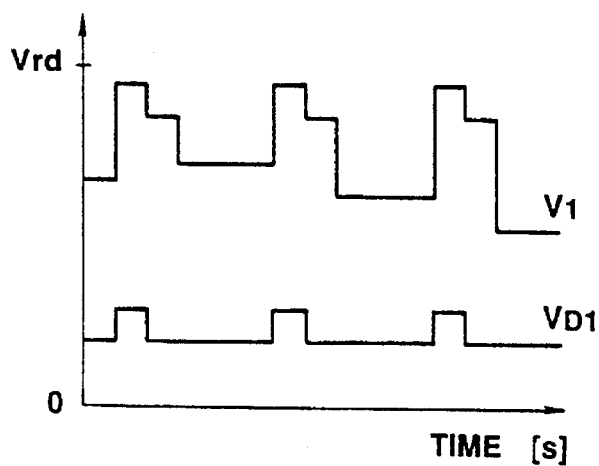
Figure 5D:
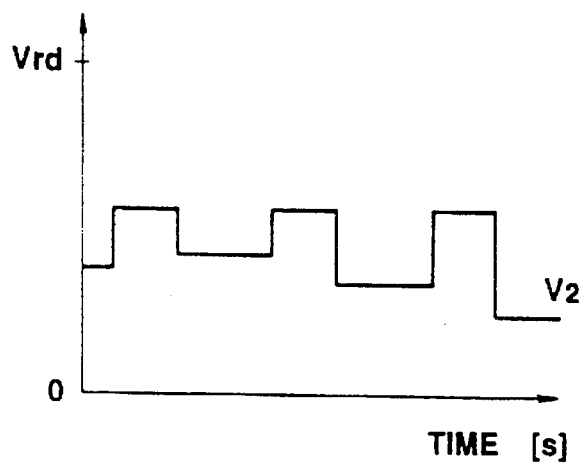

In this case, the output impedance of the first differential amplifying circuit 6 is varied by the dummy pulse $V_{D1}$, consequently subtracting a dummy pulse component corresponding to the coupling amount from the voltage signal V1 as shown in FIG. 5C. Thus, only a true signal component can be produced as shown in FIG. 5D. The first differential amplifying circuit 6 further amplifies the signal component with a predetermined gain and supplies the amplified signal component as the voltage signal $V_2$ to a non-inversion input terminal in the differential operational amplifying circuit 3 on the subsequent stage.

Meanwhile, in the reference signal output circuit 2, a voltage $V_{gg2}$ of an average value of the voltage $V_{FD}$ outputted from the floating diffusion (FD) of the discharge element 7 is applied via an input terminal 14 to the gate electrode of the output element 8a in the first follower circuit 11 and the gate electrode of the output element 12a in the second source follower circuit 12. An output potential $V_{S1}$ of the first source follower circuit 11 and an output potential $V_{S2}$ of the second source follower circuit 12 are applied to the gate electrode of the first output element 13a and the gate electrode of the second output element 13b in the second differential amplifying circuit 13, respectively. Therefore, the output potential of the second differential amplifying circuit 13, that is, the signal level of a reference signal $V_{ref}$ from the reference signal output circuit 2, is substantially at an average value of the potential $V_2$ supplied to the non-inversion input terminal of the differential operational amplifying circuit 3.

Consequently, a signal Vout outputted from an output terminal 16 of the differential operational amplifying circuit 3 is a signal consisting of the difference between voltage signal $V_2$ from the correction voltage output circuit 1 and the reference signal $V_{ref}$ from the reference signal output circuit 2 supplied to the non-inversion input terminal, amplified with an amplification factor of (Ri+Rf)/Rf.

As each of the correction voltage output circuit 1 and the reference signal output circuit 2 is composed of six N-channel MOS transistors, these circuits can be formed on a single substrate along with the CCD charge transfer section and the discharge elements 7, 9.

Figure 7:
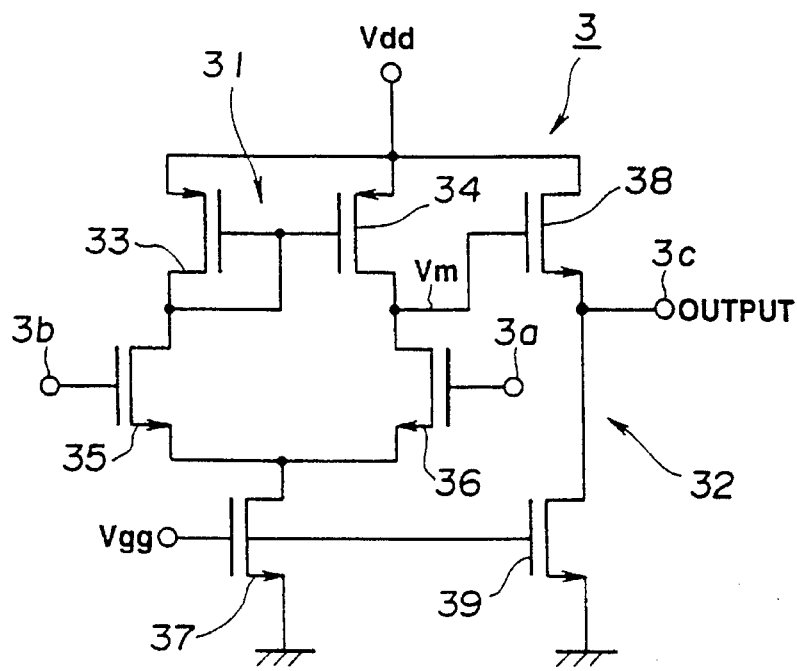
FIG. 7 is a circuit diagram showing a differential operational amplifying circuit as a constituent circuit of the output circuitry in the charge transfer device of the first embodiment.

Meanwhile, the differential operational amplifying circuit 3 of the present embodiment is constituted by a current mirror circuit 31 and a source follower circuit 32 connected thereto, as shown in FIG. 7.

The current mirror circuit 31 is constituted by a first transistor 33, that is, a P-channel MOS transistor having a short circuit between a source terminal and a gate electrode, a second transistor 34, that is, a P-channel MOS transistor having a gate electrode common with the first transistor 33, a third transistor 35, that is, an N-channel transistor connected in series with the first transistor 33 and having a gate electrode connected with the non-inversion input terminal 3b, a fourth transistor 36, that is, an N-channel MOS transistor connected in series with the second transistor 34 and having a gate electrode connected with the inversion input terminal 3a, and a fifth transistor 37, that is, an N-channel MOS transistor forming a constant current source with a control voltage $V_{gg}$ between a common source terminal of the third and fourth transistors 35, 36 and GND.

The source follower circuit 32 is constituted by an output element 38 and a load resistance element 39 which are composed of N-channel transistors, respectively, and are connected in series.

The output element 38 and the load resistance element 39 are so connected that an output potential $V_m$, that is, the contact potential of the second and fourth transistors 34, 36, of the current mirror circuit 31 is supplied to a gate electrode of the output element 38 in the source follower circuit 32, and that a constant potential $V_{gg}$ is applied to a gate electrode of the fifth transistor 37 forming the constant current source of the current mirror circuit 32 and to a gate electrode of the load resistance element 39 in the source follower circuit 32.

A common power source voltage Vdd is applied to drain terminals of the first and second transistors in the current mirror circuit 31 and a drain terminal of the output element 38 in the source follower circuit 32.

The differential operational amplifying circuit 3 is thus constituted simply by the two P-channel MOS transistors 33, 34 and the five N-channel MOS transistors 35 to 39.

Therefore, the differential operational amplifying circuit 3 can be formed on a single substrate along with the correction voltage output circuit 1 and the reference signal output circuit 2.

Figure 8:
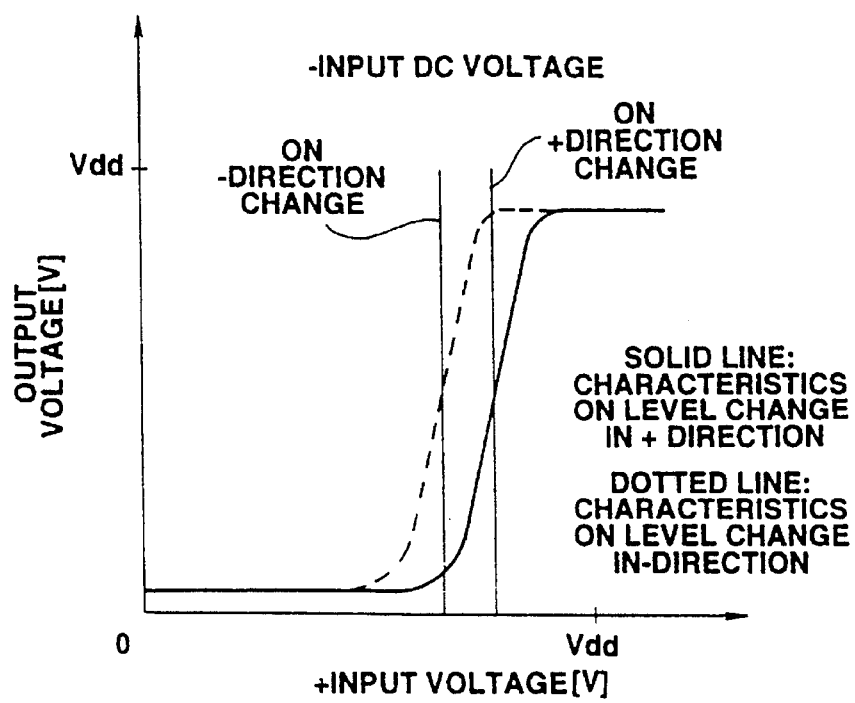
FIG. 8 is a graph showing input/output characteristics of the differential operational amplifying circuit as a constituent circuit of the output circuitry in the charge transfer device of the first embodiment.

Meanwhile, the differential operational amplifying circuit 3 has characteristics shown by a solid line in FIG. 8 when the voltage value of the reference voltage $V_{ref}$ supplied to the inversion input terminal 3a is high. The differential operational amplifying circuit 3 has characteristics shown by a dotted line when the voltage value of the reference voltage $V_{ref}$ supplied to the inversion input terminal 3a is low. Stated differently, the differential operational amplifying circuit 3 has such characteristics that the dynamic point changes in response to the voltage value of the reference voltage $V_{ref}$ supplied to the inversion input terminal 3a and that the dynamic point is located at the optimum dynamic point if the value of the reference voltage $V_{ref}$ equals an average value of the voltage signal $V_2$ from the correction voltage output circuit 1.

The reference signal output circuit 2 has the circuit constant substantially equal to that of the correction voltage output circuit 1. Therefore, if any level change in the positive direction is caused in the voltage signal $V_2$ outputted from the correction voltage output circuit 1 by changes in temperature and power source voltage within the electronic equipment incorporating the charge transfer device of the first embodiment, the reference voltage $V_{ref}$ is also changed by an amount corresponding to the level change in the positive direction caused in the voltage signal $V_2$.

In short, when the level change in the positive direction is caused in the voltage signal $V_2$, the input/output characteristics curve shifts to the right and the reference voltage $V_{ref}$ simultaneously shifts to the right by the same amount of the level change, as shown in FIG. 8. Consequently, the dynamic point of the differential operational amplifying circuit 3 is located at the optimum position, relatively unchanged from the dynamic point before the level change.

Similarly, when a level change in the negative direction is caused in the voltage signal $V_2$, the input/output characteristics curve shifts to the left as shown by the broken line in FIG. 8, and the reference voltage $V_{ref}$ simultaneously shifts to the left by the same amount of the level change. Consequently, the dynamic point of the differential operational amplifying circuit 3 is located at the optimum position, relatively unchanged from the dynamic point before the level change.

Thus, in the charge transfer device of the first embodiment, the voltage signal $V_1$ from the first source follower circuit 8 for performing current amplification of the voltage signal $V_{FD}$ voltage-converted by the discharge element is applied to the first differential amplifying circuit 6 on the subsequent stage, and a bias component $V_{D1}$ from the second source follower circuit 10 for outputting at least the a signal component $V_{D1}$ corresponding to a bias component of the voltage signal $V_1$, that is, the coupling amount, is also supplied to the first differential amplifying circuit 6 on the subsequent stage.

The first differential amplifying circuit 6 removes the bias component $V_{D1}$ from the supplied voltage signal $V_1$ and amplifies the resulting voltage signal. Consequently, the voltage signal $V_2$ outputted from the first differential amplifying circuit 6 is a signal composed of a true signal component of the voltage signal $V_1$ from the first source follower circuit 8 from which the bias component $V_{D1}$ is removed and which is then amplified. For this reason, the differential operational amplifying circuit 3 is provided with the true signal component amplified by the first differential amplifying circuit 6 and the reference signal $V_{ref}$ from the reference signal output circuit 2. The signal Vout outputted from the differential operational amplifying circuit 3 is an amplified signal of the true signal component of the voltage signal $V_2$ which is corrected in level change due to the changes in temperature and power source voltage. Thus, a signal of a level adjusted to the input dynamic range of the high gain amplifier connected to the subsequent stage of the differential operational amplifying circuit 3 can be produced.

The first source follower circuit 8, the second source follower circuit 10 and the first differential amplifying circuit 6 constituting the correction voltage output circuit 1 are constituted by N-channel MOS transistors, respectively, and the reference signal output circuit 2 is constituted by a source follower circuit of the number of stages equal to that of the source follower circuit constituting the correction voltage output circuit 1. Thus, the reference signal output circuit 2 can be formed to have the circuit constant equal to that of the correction voltage output circuit 1, and can be formed on a single substrate along with the correction voltage output circuit 1. Consequently, irregularities in producing the source follower circuits, such as fluctuation in threshold value, can be absorbed by the differential operational amplifying circuit 3 on the subsequent stage, and stable input/output characteristics can be produced.

Thus, if the present charge transfer device is utilized for the charge transfer stage of the image scanner, a highly defined image can be displayed on the monitor. If the present charge transfer device is utilized for the charge transfer stage of the CCD delay line, the S/N ratio of the signal to be delayed can be improved, reducing the signal processing on the subsequent stage.

In addition, as the differential operational amplifying circuit 3 is constituted by the current mirror circuit 31 and the source follower circuit 32 which are composed of plural N-channel MOS transistor, the differential operational amplifying circuit 3 can be formed on a single substrate along with the correction voltage output circuit 1 and the reference signal output circuit 2. The charge transfer section and its peripheral circuits, that is, the correction voltage output circuit 1, the reference signal output circuit 2 and the differential operational amplifying circuit 3 can be formed in one chip, reducing in size the electronic equipment incorporating the present charge transfer device.

The charge transfer device of the second embodiment will now be described with reference to FIG. 9. The structure and circuit performing the same operation as in the charge transfer device of the first embodiment are denoted by the same reference numerals as those in the first embodiment, without detailed description thereof.

The charge transfer device of the second embodiment, though having substantially the same structure as that of the charge transfer device of the first embodiment, differs in having an amplification factor variable control unit 41 for variably controlling the amplification factor of the differential operational amplifying circuit 3, inserted to be connected between the reference signal output circuit 1 and the differential operational amplifying circuit 3.

Stated differently, the charge transfer device of the second embodiment has first to fourth resistors 42 to 45 connected in series and inserted between the output terminal of the second differential amplifying circuit 13 of the reference signal output circuit 2 and the output terminal 3c of the differential operational amplifying circuit 3, as shown in

15

Figure 9:
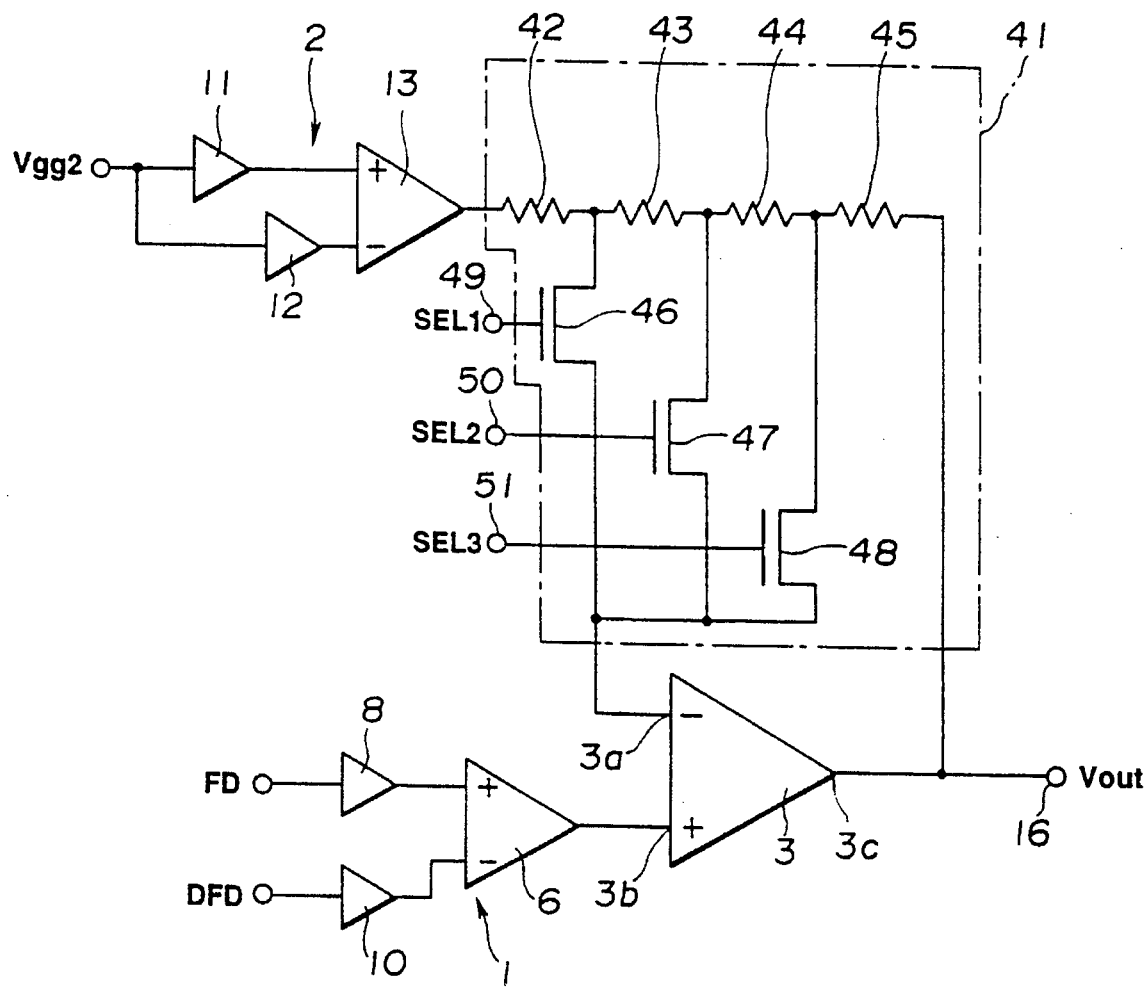
FIG. 9 is a block diagram showing essential portions of a second embodiment of the charge transfer device according to the present invention, and particularly an output circuitry thereof.

FIG. 9. A first selector 46 is inserted between the connecting point of the first and second resistors 42, 43 and the inversion input terminal 3a of the differential operational amplifying circuit 3. A second selector 47 is inserted between the connecting point of the third and fourth resistors 43, 44 and the inversion input terminal 3a. A third selector 48 is inserted between the third and fourth resistors 44, 45 and the inversion input terminal 3a.

The first to third selectors 46 to 48 are composed of N-channel MOS transistors, respectively, and have their respective gate electrodes connected with input terminals 49 to 51 for external transfer.

In the charge transfer device of the second embodiment of the above-described structure, select signals SEL1 to SEL3 of high level are selectively applied through the input terminals 49 to 51 to the gate electrodes of the first to third selectors 46 to 48. The amplification factor of the differential operational amplifying circuit 3 can be thus controlled variably to a desired value.

If resistance values of the four resistors 42 to 45 connected in series are denoted by R1, R2, R3 and R4, respectively, an amplification factor $A_1$ of the differential operational amplifying circuit 3 with the select signal SEL1 supplied through the input terminal 49 to the first selector 46 is expressed by the following formula (1):

$$A_1 \approx R/(R2+R3+R4) \tag{1}$$

wherein R=R1+R2+R3+R4 holds.

An amplification factor $A_2$ of the differential operational amplifying circuit 3 with the select signal SEL2 supplied through the input terminal 50 to the second selector 47 is expressed by the following formula (2):

$$A_2 R/(R3+R4) \tag{2}$$

An amplification factor $A_3$ of the differential operational amplifying circuit 3 with the select signal SEL3 supplied through the input terminal 51 to the third selector 48 is expressed by the following formula (3):

$$A_3 \approx R/R3 \tag{3}$$

In the charge transfer device of the second embodiment, similar to the charge transfer device of the first embodiment, the signal Vout outputted from the output terminal 16 is an amplified signal of the true signal component of the voltage signal $V_2$ which is corrected in level change due to the changes in temperature and power source voltage. Thus, a signal of a level adjusted to the input dynamic range of the high gain amplifier connected to the subsequent stage of the differential operational amplifying circuit 3 can be produced.

Particularly, since the charge transfer device of the second embodiment has the amplification factor variable control unit 41 for variably controlling the amplification factor of the differential operational amplifying circuit provided between the reference signal output circuit 2 and the differential operational amplifying circuit 3, the amplification factor for the voltage signal from the correction voltage output circuit is variably controlled. That is, the level of the voltage signal can be variably controlled so as to be adjusted to the input dynamic range of various high gain amplifiers selectively connected to the subsequent stage, and changing the charge transfer device itself in design in accordance with the input/output characteristics of the high gain amplifier connected to the subsequent stage can be omitted.

In the charge transfer devices of the first and second embodiments, the charge-voltage converting section is applied in the charge transfer device having the floating diffusion. However, the charge-voltage converting section can also be applied in the charge transfer device having a floating gate.

What is claimed is:

1. A charge transfer device comprising:

a charge transfer section for outputting a signal charge;

a correction voltage signal output circuit for voltage-converting the signal charge into a voltage and outputting a correction voltage signal;

a reference signal output circuit for outputting a reference signal of a predetermined voltage, the reference signal output circuit having a circuit constant substantially equal to a circuit constant of the correction voltage signal output circuit; and a differential operational amplifying circuit for amplifying a difference between the correction voltage signal from the correction voltage signal output circuit and the reference signal from the reference signal output circuit and outputting the amplified difference, wherein the reference signal output circuit includes first and second source follower circuits coupled respectively to a differential amplifying circuit.

2. The charge transfer device as claimed in claim 1, further comprising an amplification factor variable control circuit for variably controlling an amplification factor of the differential operational amplifying circuit between the reference signal output circuit and the differential operational amplifying circuit.

3. The charge transfer device, comprising:

a charge transfer section for outputting a signal charge;

a voltage signal output circuit for converting the signal charge into a voltage and outputting a voltage signal;

a reference signal output circuit for outputting a reference signal of a predetermined voltage, the reference signal output circuit having a circuit constant substantially equal to a circuit constant of the voltage signal output circuit; and a differential operational amplifying circuit for amplifying a difference between the voltage signal from the voltage signal output circuit and the reference signal from the reference signal output circuit and outputting the amplified difference, wherein the voltage signal output circuit has a first output circuit for converting the signal charge from the charge transfer section and outputting a first voltage signal, a second output circuit for outputting a bias component of the first voltage signal, and a differential amplifying circuit for amplifying a difference between the first voltage signal and the bias component and outputting the amplified difference.

4. The charge transfer device as claimed in claim 3, wherein the first output circuit, the second output circuit and the differential amplifying circuit include source follower circuits, respectively.

5. The charge transfer device as claimed in claim 4, wherein the reference signal output circuit includes a source follower circuit having a number of stages equal to the number of stages of the source follower circuits.

6. The charge transfer device as claimed in claim 3, further comprising an amplification factor variable control circuit for variably controlling an amplification factor of the differential operational amplifying circuit between the reference signal output circuit and the differential operational amplifying circuit.

7. The charge transfer device comprising, a charge transfer section for outputting a signal charge;

a voltage signal output circuit for converting the signal charge into a voltage and outputting a voltage signal;

a reference signal output circuit for outputting a reference signal of a predetermined voltage, the reference signal output circuit having a circuit constant substantially equal to a circuit constant of the voltage signal output circuit; and a differential operational amplifying circuit for amplifying a difference between the voltage signal from the voltage signal output circuit and the reference signal from the reference signal output circuit and outputting the amplified difference, wherein the differential operational amplifying circuit includes a current mirror circuit composed of plural N-channel MOS transistors, and a source follower circuit.

8. The charge transfer device as claimed in claim 7, further comprising an amplification factor variable control circuit for variably controlling an amplification factor of the differential operational amplifying circuit between the reference signal output circuit and the differential operational amplifying circuit.

9. An output circuit of a charge transfer device comprising:

a correction voltage signal output section for converting a signal charge from a charge transfer section into a voltage and outputting a correction voltage signal;

a reference signal output section for outputting a reference signal of a predetermined voltage, the reference signal output section having a circuit constant substantially equal to a circuit constant of the correction voltage signal output section; and a differential operational amplifying section for amplifying a difference between the correction voltage signal from the correction voltage signal output section and the reference signal from the reference signal output section and outputting the amplified difference, wherein the reference signal output section has first and second source follower circuits coupled respectively to a differential amplifying circuit.

10. An output circuit of a charge transfer device, comprising:

a voltage signal output section for converting a signal charge from a charge transfer section into a voltage and outputting a voltage signal;

a reference signal output section for outputting a reference signal of a predetermined voltage, the reference signal output section having a circuit constant substantially equal to a circuit constant of the voltage signal output section; and a differential operational amplifying section for amplifying a difference between the voltage signal from the voltage signal output section and the reference signal from the reference signal output section and outputting the amplified difference, wherein the voltage signal output section has a first output circuit section for converting the signal charge from the charge transfer section and outputting a first voltage signal, a second output circuit section for outputting a bias component of the first voltage signal, and a differential amplifying section for amplifying a difference between the first voltage signal and the bias component and outputting the amplified difference.

11. The output circuit as claimed in claim 10, wherein the first output circuit section, the second output circuit section and the differential amplifying section include source follower circuits, respectively.

12. The output circuit as claimed in claim 11, wherein the reference signal output section includes a source follower circuit having a number of stages equal to the number of stages of the source follower circuits.

* * * * *